United States Patent

Herold et al.

[15] 3,641,273

[45] Feb. 8, 1972

[54] MULTIPLE DATA TRANSMISSION SYSTEM WITH VARIABLE BANDWIDTH ALLOCATION AMONG THE TRANSMITTING STATIONS

[72] Inventors: Wolf Herold, Ay, Iller; Horst Ohnsorge, Erstetten, both of Germany

[73] Assignee: Telefunken Patentverwertungsgesellschaft m.b.H., Ulm, Danube, Germany

[22] Filed: Sept. 22, 1969

[21] Appl. No.: 859,887

[30] Foreign Application Priority Data

Sept. 20, 1968 Germany......................P 17 91 135.2

[52] U.S. Cl.........................................................179/15 BA
[51] Int. Cl...........................................................H04j 3/16
[58] Field of Search............179/15 AS, 18 FG, 15 A, 15 BA; 340/413

[56] References Cited

UNITED STATES PATENTS 3,406,257 10/1968 Long..................................179/15 AS

*Primary Examiner*—Kathleen H. Claffy
*Assistant Examiner*—David L. Stewart
*Attorney*—Spencer and Kaye

[57] ABSTRACT

In a multiplex data transmission system including several stations connected to a common transmission path and each serving a plurality of independent users, with each user being assigned an individual channel and each station being assigned a portion of the total transmission path capacity, means are provided for varying the size of the portion available to each station in accordance with the number of its users actually desiring to use the transmission path.

5 Claims, 6 Drawing Figures

Inventors.
Wolf Herold
Horst Ohnsorge
BY Spencer & Kaye
ATTORNEYS.

Inventors
Wolf Herold
Horst Ohnsorge

BY Spencer & Kaye
ATTORNEYS.

INVENTORS.
Wolf Herold
Horst Ohnsorge
BY Spencer & Kaye
ATTORNEYS.

INVENTORS.
Wolf Herold
Horst Ohnsorge

BY Spencer & Kaye
ATTORNEYS.

MULTIPLE DATA TRANSMISSION SYSTEM WITH VARIABLE BANDWIDTH ALLOCATION AMONG THE TRANSMITTING STATIONS

BACKGROUND OF THE INVENTION

The present invention relates to a data transmission system employing time- or frequency-multiplexing and in which at least two stations participate in the transmission of data in such a manner that each station has associated therewith at least one block containing a plurality of individual data channels which it places at the disposal of its users.

In data transmission systems it is usually desired, particularly for data transmission via satellite links, to utilize the available information transmission capacity, as completely as possible. Conventional methods for achieving such maximum utilization involve multiplexing processes primarily frequency-division multiplexing, where the available frequency range is so divided that each of the stations participating in the data transmission has its own associated discrete frequency band, or time-division multiplexing, where the individual stations participate in the data transmission in a predetermined time sequence in a cyclic manner so that, during each cycle, each one of the individual stations is assigned an interval during which it can regularly transmit its data.

Both techniques can be traced to a common basic idea which is depicted in FIG. 1 schematically illustrating time- and frequency-division multiplexing processes for a plurality of stations. The upper diagram of FIG. 1 illustrates the allocation of a main transmission path among several multiple-user stations 1, 2, 3, 4 on a time-division multiplexing basis while the lower diagram illustrates a comparable frequency- division multiplexing allocation.

The two representations differ from one another only in that the first is based on a time scale while the second is based on a frequency scale. It is therefore unnecessary in the following discussion to distinguish between time and frequency multiplexing insofar as concerns the problem to which the present invention is directed and the solution on which the invention is based.

When a plurality of stations participate in the transmission of data, each of these stations is usually merely a collecting point for a plurality of users. In other words, at each station there simultaneously appears a plurality of individual signals which are independent of one another. Each one of the users thus has his own channel in the station and, in a conventional manner, all channels from one station are associated with one data block. This block is assigned a fixed location within the total time period of each data transmission cycle or within the total time period of each data transmission cycle or within the total available frequency range.

Each block is preceded by its own synchronizing signal. The synchronizing signal is followed by the individual channel signals, each preferably containing information identifying the user to whom the respective signal is to be transmitted.

The number of channels associated with each block determines the size of the block, either with regard to duration or bandwidth.

When the number of signals actually being generated at each individual station fluctuates, it is not possible to associate the unused channels belonging to the block of one station to blocks of other stations if one of the other stations should require additional channels. It thus can occur that the channels of one station are not fully utilized whereas other stations can not provide all of their users with a channel because their blocks are fully occupied.

SUMMARY OF THE INVENTION

It is the object of the present invention to eliminate this drawback and to optimally utilize the available capacity of the data transmission path.

A further object of the invention is to increase the degree of transmission path utilization in systems of the above type.

Another object of the invention is to adapt the delivery of signals to a transmission path to the current user requirements.

These and other objects according to the invention are achieved, in a multiplex data transmission system including a single transmission path, a plurality of stations each having a plurality of channels for individual users, and multiplexing means for placing a respective portion of the data handling capacity of the transmission path at the disposal of each station, by the improvement composed of control means connected to the stations for varying the size of the portion at the disposal of each station in accordance with the number of its associated channels being currently used.

DESCRIPTION OF THE PREFERRED EMBODIMENTS

Figure 1:
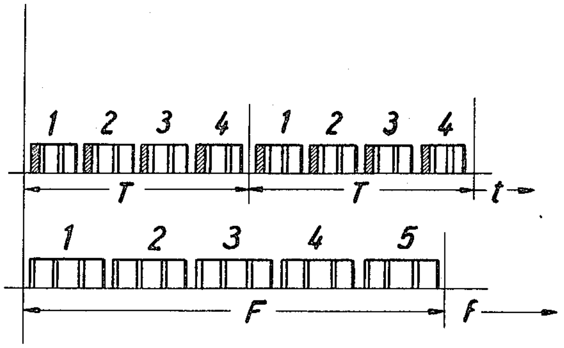
FIG. 1 is a diagrammatic representation of the signal transmission sequences according to standard multiplexing techniques.

FIG. 1 shows, as already mentioned, a schematic representation of time-division multiplexing and frequency-division multiplexing. In the time multiplex system the data transmission cycles are referred to as frames each having a period, or duration, T. Within a frame, each of the individual stations 1–4 is assigned a time block during which it can transmit data. Conventionally, each station first transmits a synchronizing signal, which is indicated by hatching, and then transmits a sample of the signals in the individual channels at this station's disposal. In front of each individual sample there is also inserted an address signal which, when compared with the actual sample, takes up very little time. This address signal contains information identifying the station which is transmitting, the station which is to receive the sample and the individual channel to which it relates.

In an analogous manner, the frequency multiplexing method divides the frequency range F available for all stations into frequency bands each associated with a respective station 1, 2, 3, 4 or 5 and each subdivided into narrower bands associated with the plurality of channels of its respective station. In FIG. 1 the full frequency bandwidth F is also not fully utilized for the data transmission when employing frequency multiplexing, rather narrow spaces are left which can be used, for example, for control purposes.

Figure 2:
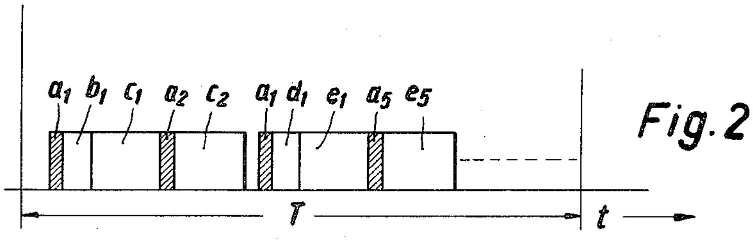
FIG. 2 is a similar representation of a signal transmission sequence according to one preferred embodiment of the invention.

Since the individual stations have their fixed block lengths, even though they might vary from station to station, the number of channels at the disposal of each station is fixed independently of the actual requirement for transmission capacity per station, and this can lead to an unfavorable utilization of the system. FIG. 2 illustrates the manner in which the present invention helps to eliminate this drawback. According to the invention, one fixed block is no longer associated with each individual station, but rather with each channel actually in use. Preferably, a transmission from each channel associated with a calling user is immediately followed, in time or frequency, by a transmission from the channel of the answering user. It is then sufficient to send out the address signal only once because the connection is then assured by such succession and this permits a reduction in the band required for the exchange.

FIG. 2 shows, from left to right, corresponding with the chronological sequence, the synchronizing signal $a_1$ of the first transmitting station 1, followed by the address signal $b_1$ and the data signal $c_1$ for a particular channel at that station. The address signal $b_1$ establishes that the desired receiver occupies a channel of station 2. Consequently, the synchronizing signal $a_2$ of station 2 occurs directly after signal $c_1$ and is followed by data signal $c_2$ from the receiving channel without any address signal preceding such data signal.

Correspondingly, a signal $e_1$, which follows the synchronizing signal $a_1$ and address signal $d_1$, is immediately followed by the synchronizing signal $a_5$ of the station containing the receiving channel, from which channel is transmitted a signal $e_5$.

The main advantage of such a system consists in the saving of address time. Depending on the system employed, the address signals may be substantially longer than synchronizing signals so that despite the repeated transmission of synchronizing signals, considerable periods of time can be saved. Moreover, as has already been mentioned, the transmission capacity of each station is no longer rigidly fixed.

For each block is of relatively short duration (it contains e.g., 40 bits), normally a certain time is necessary until the called user begins to transmit a response, for the communication has to be established first. Before it is established, the blocks contain only the data of the calling user.

Figure 3:
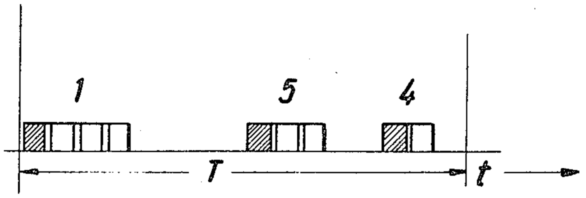
FIG. 3 is a view similar to that of FIG. 2 relating to another preferred embodiment of the invention.

According to another embodiment of the present invention, the "answer" is no longer directly "attached" to the call but blocks of variable length are formed for each station as shown in FIG. 3. Address portions are then required for each information signal in order to assure the proper connection of the channels. The individual stations no longer have a fixed location for their blocks within the frames, but automatically take up free locations. This is very easy because all the stations must, in any event, monitor the entire frame and are provided with devices which can so displace their blocks with respect to time that they will receive the correct time position based on their synchronizing signals.

The explanations given above for the time multiplexing method can analogously be applied to a frequency-division multiplexing method, in which case the synchronizing signals are eliminated.

Figure 4:
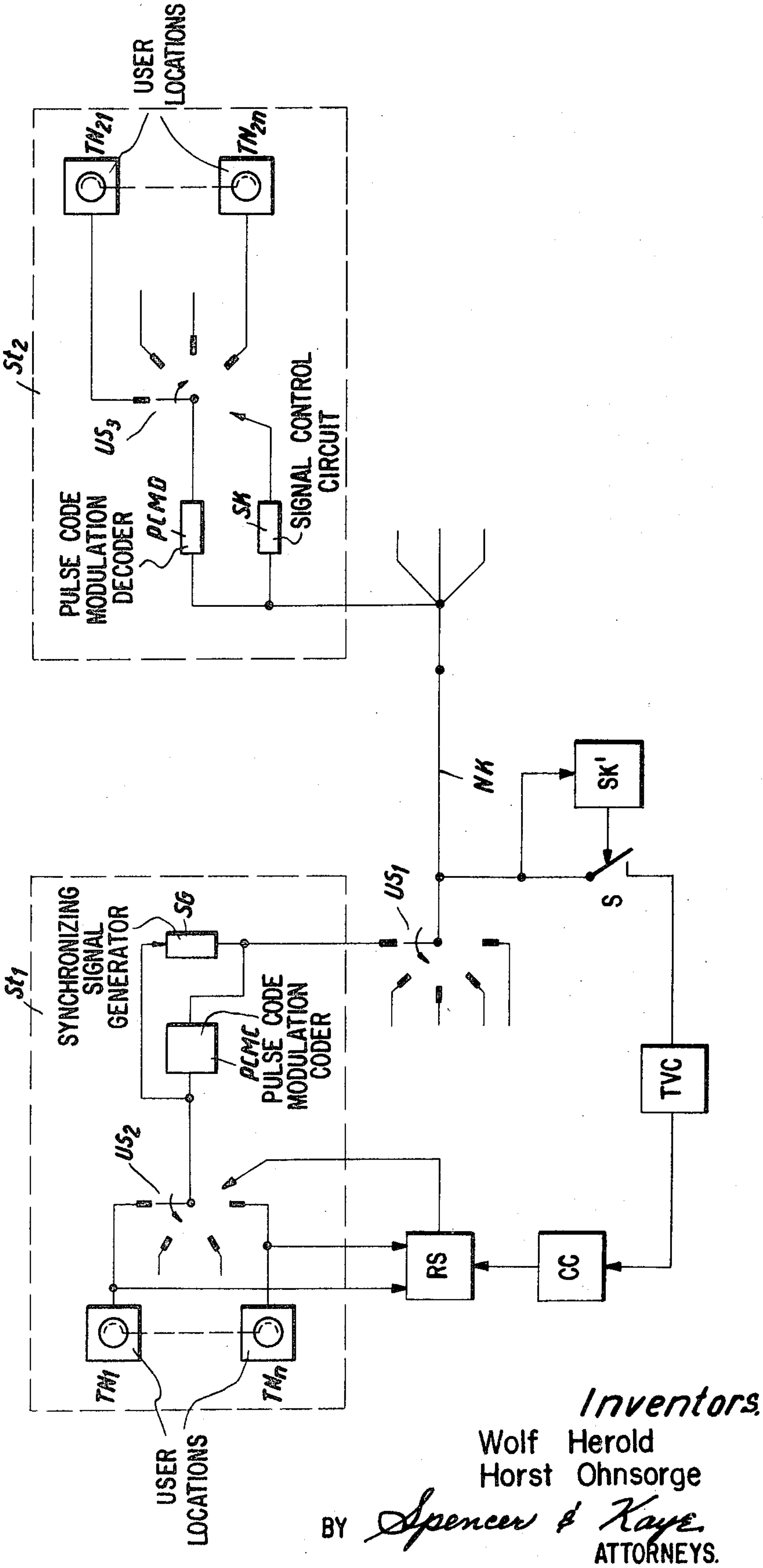
FIG. 4 is a circuit diagram of a system constituting a preferred embodiment of the invention.

FIG. 4 shows one type of time-division multiplex circuit arranged to operate according to the invention. Two stations $St_1$ and $St_2$ are connected to a main transmission path NK, station $St_1$ being the transmitting station whereas station $St_2$ is the receiving station. Consequently station $St_2$ is always connected to the transmission path NK, whereas station $St_1$ is selectively connected to path NK via one contact of a rotary switch $US_1$, or its electronic equivalent. As is indicated in the drawing, a plurality of receiving stations as well as a plurality of transmitting stations are connected to path NK, the latter being connected via further contacts of rotary switch $US_1$.

Station $St_1$ contains a plurality of user locations $TN_1$ to $TN_2$ connected to respective terminals of a further rotary switch $US_2$ which places each transmitter for short intervals $\Delta T$ in contact with a pulse code modulation coder PCMC connected to the associated terminal of the rotary switch $US_1$. Parallel to the coder PCMC there is connected a synchronizing signal generator SG. The interval $\Delta T$ corresponds to the time available per channel within the block associated with the station.

The synchronizing signal generator transmits the synchronizing signal of the transmitting station and the address signal of the receiving location before transmission of information over the respective channel. Such synchronizing signal generators are described, for example, in the article by Birdscall, Ristenbatt and Weinstein, "Analysis of Asynchronous Time Multiplexing," IRE Trans. on Comm. Systems, Vol. CS–10, Dec. 1962. The rotary switch $US_2$ does not switch in a regular sequence, but rather in accordance with the user locations desiring a connection. Rotary switch $US_1$ connects path NK to station $St_1$ during time intervals $\Delta T_1$. These time intervals $\Delta T_1$ are not constant but are adapted to the time requirements of the station.

If now, due to the irregular switching sequences of the rotary switches, it occurs that several users of a station transmit immediately following one another, an advantageous further development of the present invention makes it possible, as described to eliminate a portion of the synchronizing signals.

The receiving station $St_2$ receives the entire data flow through data path NK. These data are decoded in a pulse code modulation decoder PCMD and are checked in a synchronizing-address signal control circuit SK to determine whether data for any of the users $TN_{21}$–$TN_{2n}$ is contained in the data flow. The output signal from circuit SK controls the operation of rotary switch $US_3$ to deliver the output signals from decoder PCMD to the appropriate user.

The synchronizing signal control is also described, for example, in the above-cited article by Birdscall et al. The PCM coders and decoders are described, for example, in Wellhausen, "Methods for Pulse Code Modulation and Demodulation," Fernmehde-Ing., p. 19, issue 18, Aug. 1965.

Figure 5:
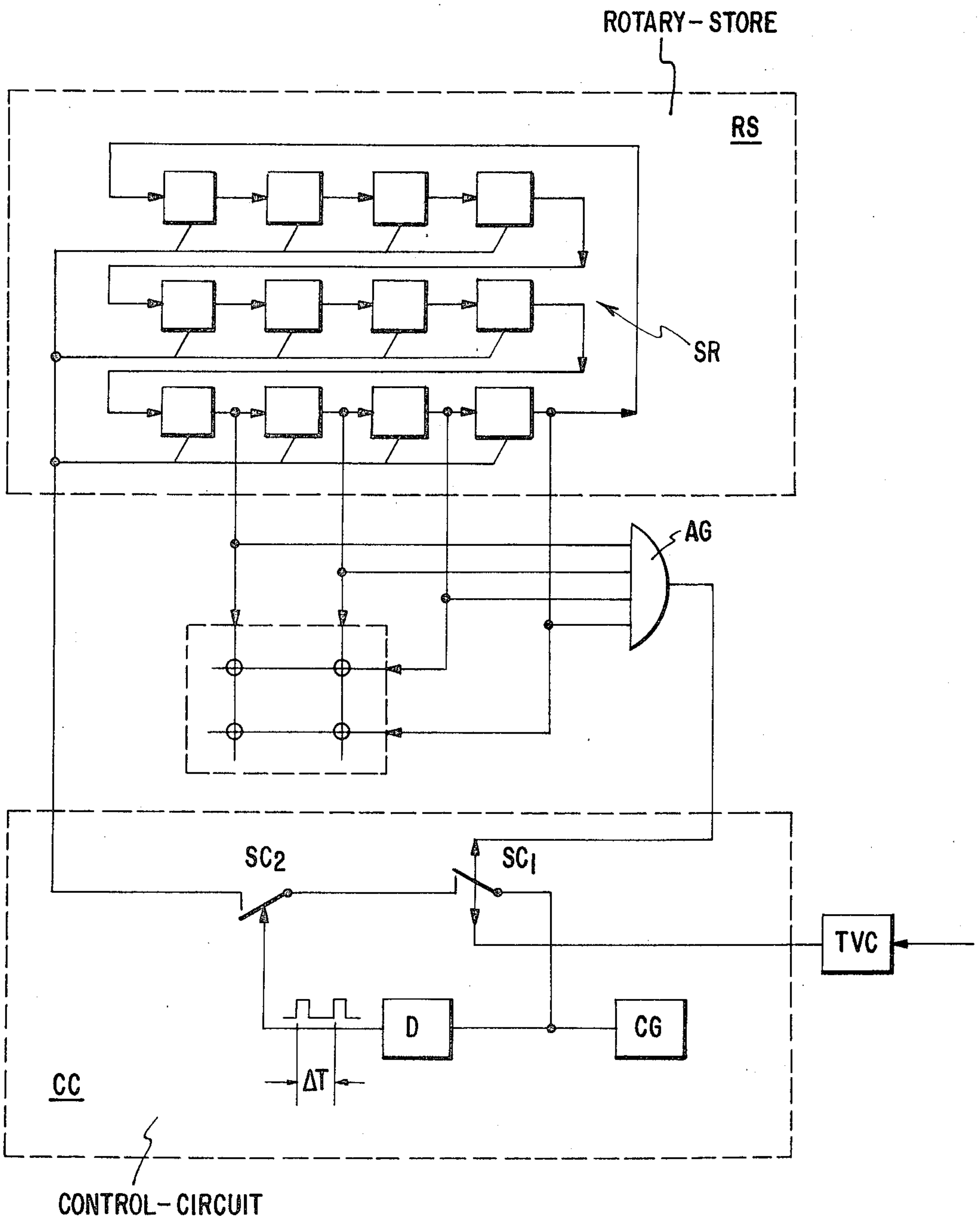
FIG. 5 is a circuit diagram of a practical example concerning to the control means shown schematically in FIG. 4.

The rotary switches $US_1$, $US_2$ are controlled by an arrangement which is shown in FIG. 4 principally and in FIG. 5 more in detail.

In FIG. 4, another signal control circuit $Sk'$ is provided which is checking the data to be transmitted. For each one of the inputs of the rotary switch $US_1$, one signal control circuit $Sk'$ is necessary. The signal control circuit $Sk'$ is of the same type as the signal control circuit $Sk$.

The signal control circuit $Sk'$ closes a switch S when the station connected with the preceding input of the rotary switch $US_1$ is transmitting. The switch S connects a threshold value circuit TVC to the data path NK. The preceding station having finished the transmission, the threshold value circuit responds to the absence of data, and controls hereby a rotary store RS by means of a control circuit CC. The rotary store RS delivers the informations concerning the operation of the rotary switch $US_2$.

FIG. 5 shows above-mentioned means in detail. The threshold value circuit TVC closes the switch $SC_1$ when responding to the absence of data. A clock generator CG delivers pulses the number of which is determined by a switch $SC_2$. The switch $SC_2$ is closed by the output pulses of the divider D; the period of these pulses is $\Delta T$. Only during each one of the output pulses of the divider D, the clock pulses are applied to a shift register SR, which if identical to the rotary store RS. The clock pulses shift the information through the shift register SR. The shift register contains the addresses of the users $TN_1$ ... $TN_n$ who actually wish to transmit data. In the shown case, each stage of the shift register consists of four bistable multivibrators, and the switch $SC_2$ is closed until exactly four clock pulses have passed. The last stage of the shift register is checked and controls the connecting of the user, whose address is stored in it, to the data path. The rotary switch $US_2$, in this example is a matrix switch which is described e.g., in pages 556–588, Steinbuch "Taschenbuch der Nachrichtenverarbeitung," Springer-Verlag, 1962. If the contents of the checked stage are 0, and AND-gate AG responds and opens the switch $SC_1$. Thus no data are delivered to the data path NK, and the next station begins to transmit in the predescribed manner. A threshold value circuit of the suitable type is described e.g., in Ohnsorge "Stordetektoren," Dissertation Aachen '67.

The storing of addresses within the rotary store RS is handled e.g., as usually in PCM-technique. described e.g., in Keister, Ketchledge, Vaughan, No. 1, ESS system Organization "Bell System Techn. Journal.," Sept. 64, pages 1831–1844.

Figure 6:
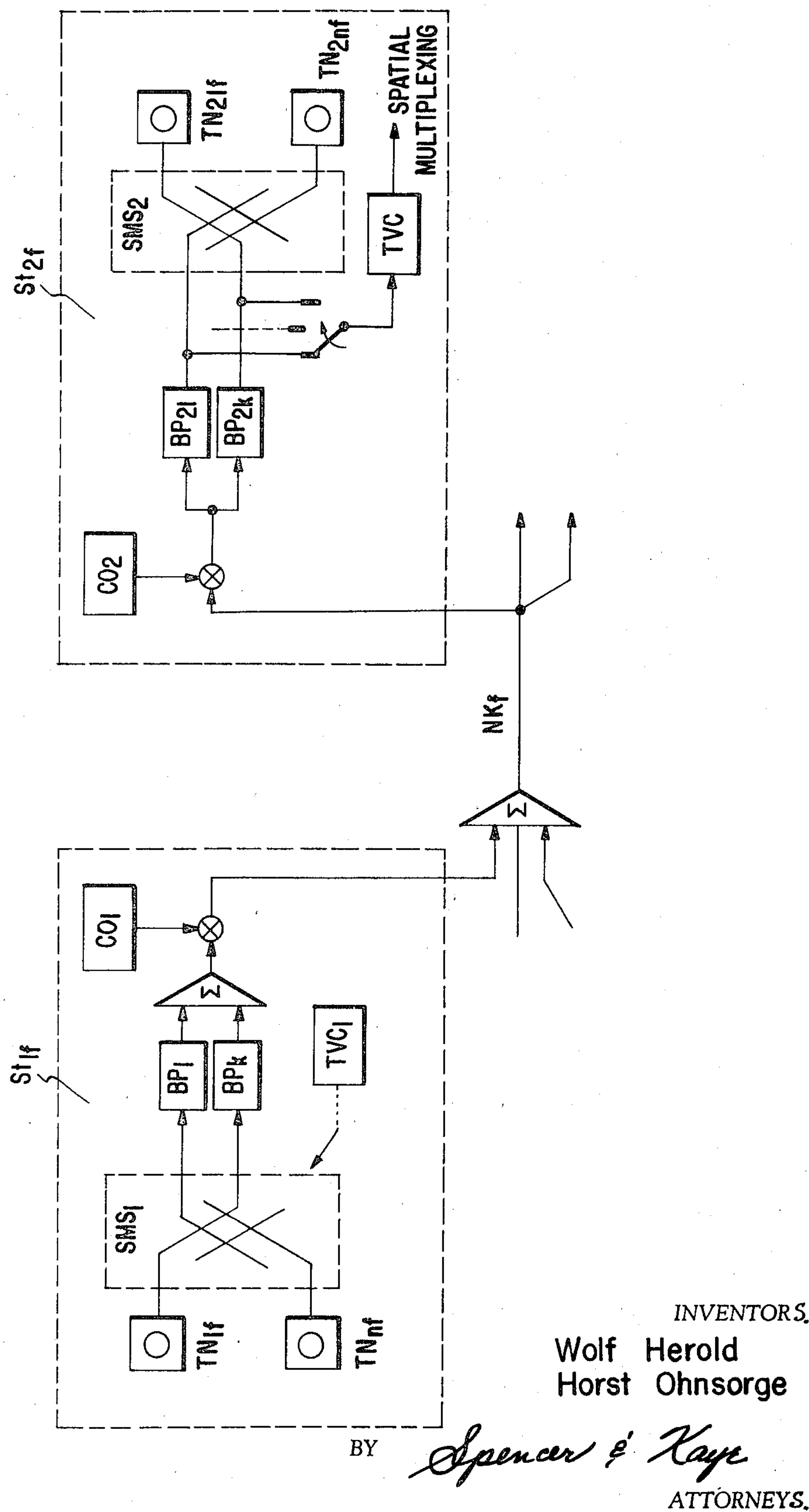
FIG. 6 is a circuit diagram of a system constituting another preferred embodiment of the invention concerning to frequency-division multiplexing transmission.

FIG. 6 shows a practical example for applying the invention to a frequency-division multiplexing. The references of details which are equal to those of the further described example are the same, but are indexed by "$f$."

The users $TN_{1f}$ ... $TN_{nf}$ of station $St_{1f}$ are connected across a space, division multiplexing system $SMS_1$ to band-pass filters $BP_1$ ... $BP_k$, where $k<n$. The sum of the outputs of the band-pass filters modulates a first carrier which is generated in an oscillator $CO_1$. The other stations have the same embodiments; their band-pass filters are selected in such manner, that each station has a certain quantity of filters only of her own and another quantity that is common to several stations, so that there is an overlapping effect between the stations. The modulated carriers of all calling stations are summed up and then transmitted over the data path $NK_f$. At the receiving stations, the information is demodulated by means of another carrier (oscillator $CO_2$) and then separated by band-pass filters $BP_2$ ... $BP_{2k}$. These band-pass filters are connected, over another space-division multiplexing system $SMS_2$, to the users $TN_{21}$ ... $TN_{2n}$ of the station $St_{2f}$. As each station is receiving and transmitting, a threshold value circuit ($TVK_1$, $TVC_2$) in each station checks over a rotary switch, which channels are free. Depending on the result of this checking, the space-division multiplexing system in the transmitting part of the station is controlled. The space-division multiplexing systems, which are used in this example are the usual ones which are well known in conventional central offices.

It will be understood that the above description of the present invention is susceptible to various modifications, changes and adaptations.

We claim:

1. In a multiplex data transmission system including a single transmission path, a plurality of stations each having a plurality of channels for individual users, and multiplexing means having a plurality of inputs each connected to a respective station and an output connected to said transmission path for placing a respective portion of the data handling capacity of the transmission path at the disposal of each station, the improvement comprising: means in each said station for connecting to the output of its respective station only those user channels currently being used; and a plurality of control means each connected to a respective one of said stations and to the output of said multiplexing means for detecting the absence of data transmission in a portion of such capacity and for introducing the transmission from its respective station into such portion.

2. An arrangement as defined in claim 1 wherein one portion of the transmission path capacity is associated with each channel being currently used.

3. An arrangement as defined in claim 2 wherein said multiplexing means perform a time-division multiplexing operation and each portion is constituted by a time period.

4. An arrangement as defined in claim 3 wherein said means are connected to each station for delivering, to said transmission path, the following data during each time period: the synchronizing signals of the station containing the channel over which a transmission is initiated and of the station to which the transmission is being delivered; data signals from the transmission initiating channel and the receiving channel; and the address signal of the receiving channel.

5. An arrangement as defined in claim 3 wherein said control means are connected to said stations for placing each time period at the disposal of a respective station and for applying to said transmission path during each time period data signals from all of the channels which are currently in use at the respective station.

* * * * *